United States Patent
Yatsu

[11] Patent Number: 5,848,148
[45] Date of Patent: *Dec. 8, 1998

[54] COMMUNICATION APPARATUS

[75] Inventor: Hiroyuki Yatsu, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 321,984

[22] Filed: Oct. 12, 1994

[30] Foreign Application Priority Data

Oct. 15, 1993 [JP] Japan ................................ 5-258492

[51] Int. Cl.⁶ .................................................. H04M 1/60
[52] U.S. Cl. .................... 379/396; 379/390; 379/389; 379/354
[58] Field of Search .............................. 379/396, 52, 354, 379/164, 130, 131, 389, 390, 8, 10, 96, 93.17, 375, 372, 376, 201, 110

[56] References Cited

U.S. PATENT DOCUMENTS

| 4,160,879 | 7/1979 | Sullivan et al. | 379/354 |
|---|---|---|---|
| 4,431,870 | 2/1984 | May et al. | 379/354 |
| 4,475,013 | 10/1984 | Lee et al. | 379/355 |
| 4,490,579 | 12/1984 | Godoshian | 174/15.5 |
| 4,777,474 | 10/1988 | Clayton | 340/539 |
| 4,908,853 | 3/1990 | Matsumoto | 379/355 |
| 4,928,306 | 5/1990 | Biswas et al. | 379/201 |
| 4,975,949 | 12/1990 | Wimsatt et al. | 379/387 |
| 4,982,424 | 1/1991 | Saito et al. | 379/376 |
| 5,327,493 | 7/1994 | Richmond et al. | 379/372 |
| 5,359,651 | 10/1994 | Draganoff | 379/354 |
| 5,373,551 | 12/1994 | Baals et al. | 379/355 |
| 5,388,152 | 2/1995 | Kawauchi | 379/157 |
| 5,392,337 | 2/1995 | Baals et al. | 379/96 |
| 5,436,954 | 7/1995 | Nishiyama et al. | 379/58 |
| 5,452,474 | 9/1995 | Witherspoon | 379/52 |
| 5,457,731 | 10/1995 | Witherspoon | 379/52 |
| 5,475,835 | 12/1995 | Hickey | 395/600 |

FOREIGN PATENT DOCUMENTS

| 54-124633 | 9/1979 | Japan . | |
|---|---|---|---|
| 62-183277 | 8/1987 | Japan . | |
| 0221969 | 9/1989 | Japan | 379/390 |
| 1-221969 | 9/1989 | Japan | 379/390 |
| 2-98265 | 4/1990 | Japan . | |
| 2-86276 | 7/1990 | Japan . | |
| 2-252344 | 10/1990 | Japan . | |
| 4-30646 | 2/1992 | Japan . | |
| 406188955A | 7/1994 | Japan | 379/390 |

OTHER PUBLICATIONS

Japanese Notification of Reason for Refusal dated Feb. 2, 1998 (w/ translation) for corresponding Japanese application. (4 pages).

"Earing Instrument" vol. 7, Nov. 7, 1986, p. 57.

"Earing Instrument" vol. 37 No. 7 1986 p. 57.

*Primary Examiner*—Ahmad F. Matar
*Attorney, Agent, or Firm*—Morgan & Finnegan LLP

[57] ABSTRACT

A communicating apparatus comprises a display unit, an input unit for inputting a dial number, an instruction unit for instructing a change in volume, and a control unit for controlling the display unit so as to display the dial number inputted by the input unit, wherein the control unit controls the display unit so as to display the kind of sound and the volume in place of the dial number in accordance with an instruction of the instruction unit. The control unit includes a generation unit for generating a plurality of kinds of sounds by a plurality of volumes. The control unit controls the display unit so as to display a message indicating that a volume of a ringing tone is being displayed and the volume of the ringing tone in accordance with an instruction by the instruction unit during the ringing.

32 Claims, 12 Drawing Sheets

FIG. 3A  | 10/25 SUN            11:30 |

FIG. 3B  | 0123456789012345678 |

FIG. 3C  | HANDSET          ▬■ |

FIG. 3D  | SPEAKER        ▬■■ |

FIG. 3E  | RINGING          ▬■ |

FIG. 3F  | TOUCH         ▬■■■ |

FIG. 5A | SPEAKER |

FIG. 5B | SPEAKER — |

FIG. 5C | SPEAKER —■ |

FIG. 5D | SPEAKER — ■ ■ |

FIG. 5E | SPEAKER — ■ ■ ■ |

FIG. 5F | SPEAKER — ■ ■ ■ ■ |

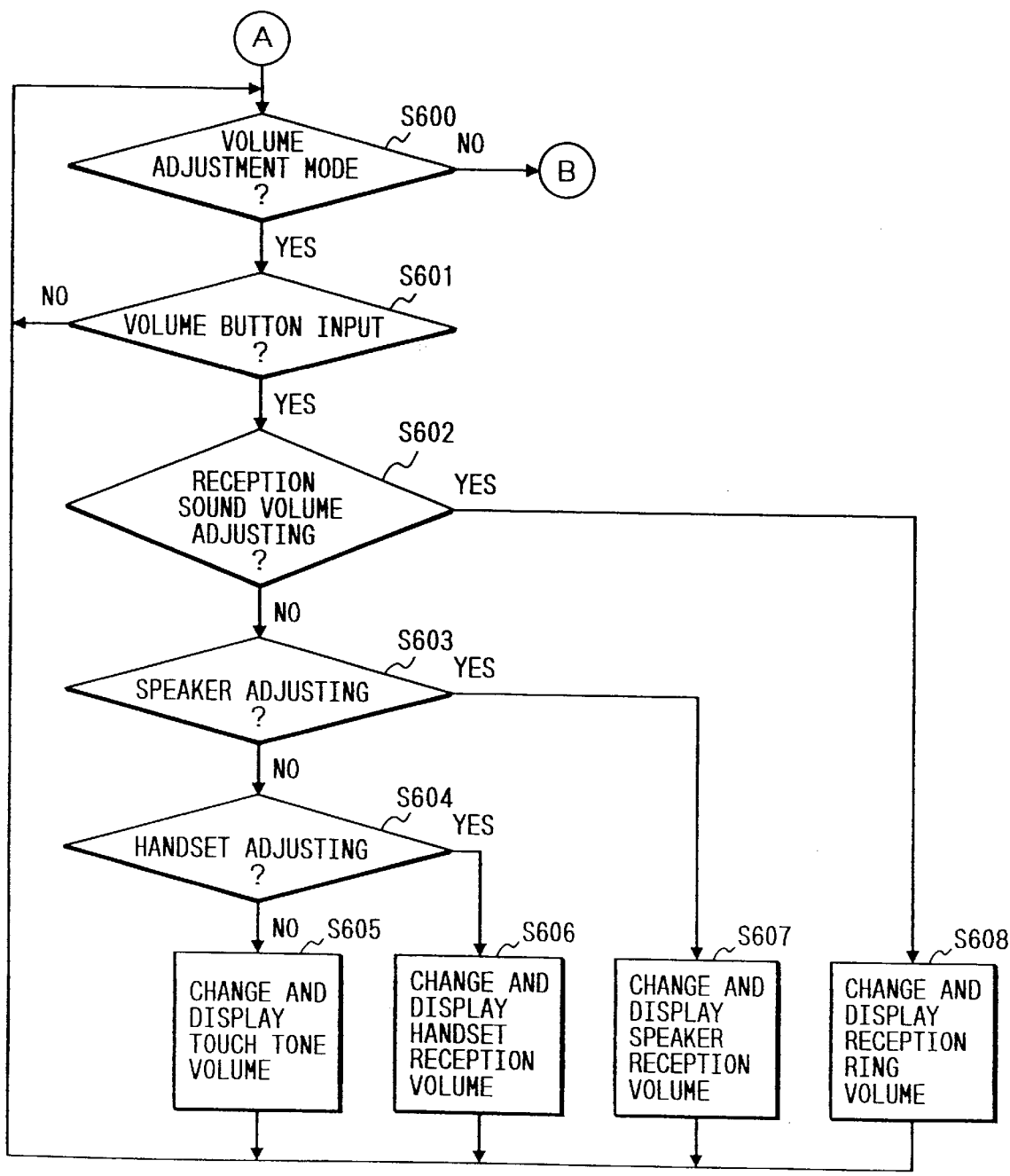

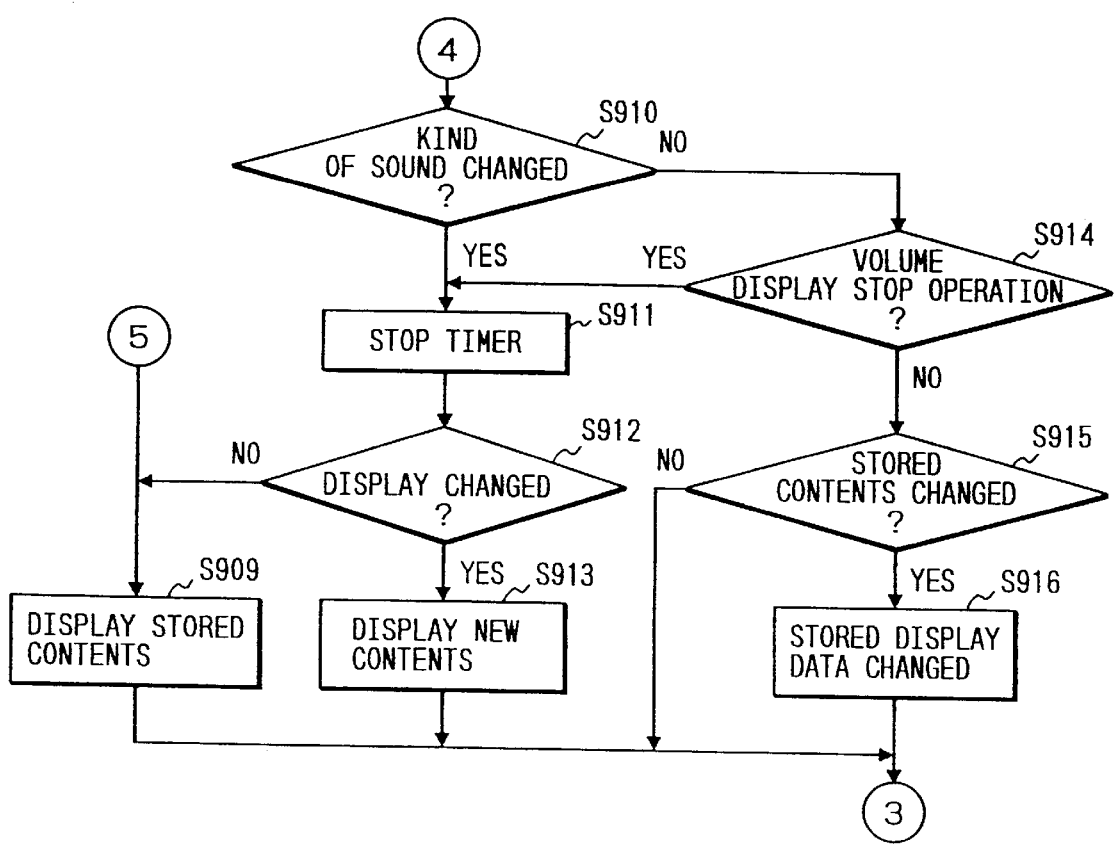

COMMUNICATION APPARATUS

BACKGROUND OF THE INVENTION

1. Field of the Invention

The present invention relates to a communicating apparatus which can adjust various volumes.

2. Related Background Art

In a telephone apparatus, it is necessary to set a plurality of volumes such as volume of a reception sound, handset reception volume at a time of a handset speech communication, speaker volume at a time of a speaker reception, and the like. Hitherto, in order to set the plurality of volumes, the volume is set by a volume knob or a switch in accordance with each volume.

On the other hand, there is a telephone apparatus having a display unit for displaying information such as dial numbers, time, and the like.

In the conventional telephone apparatus, however, there are problems such that it is necessary to provide a console unit in accordance with each of the plurality of volumes, so that the operation is troublesome, and when holes for the console units are formed for the body, it is necessary to take a countermeasure for static electricities, dust, and the like.

In recent years, therefore, a telephone apparatus which has an electronic volume and which can set a plurality of volumes by two buttons of a volume-up button and a volume-down button has been also well known.

When there are switches or volume knobs in correspondence to a plurality of volumes, the set volume can be known by the position of the knob of the switch or volume. In the electronic volume, however, there is a problem such that the set volume cannot be known. In order to solve such a problem, there is a telephone apparatus having volume display units corresponding to the plurality of volumes. In such an apparatus, however, a plurality of display units are needed, so that there are problems such that a space for the display units is large and the costs are high.

SUMMARY OF THE INVENTION

It is an object of the invention to simplify a construction for a volume adjustment.

Another object of the invention is to improve an operability for the volume adjustment.

Still another object of the invention is to display a volume by effectively using a display unit.

Further another object of the invention is to provide a communicating apparatus which selectively displays a display of dial numbers and a display for the volume adjustment.

The above and other objects and features of the present invention will become apparent from the following detailed description and the appended claims with reference to the accompanying drawings.

BRIEF DESCRIPTION OF THE DRAWINGS

FIGS. 3A to 3J are diagrams showing display examples of a display unit of the telephone apparatus in the embodiment;

FIGS. 5A to 5F are diagrams showing display examples in a range from 0 level to 5 level of the speaker reception sound volume in the embodiment;

FIG. 6 is a diagram showing an operating procedure when the reception sound volume is adjusted by a predetermined specific operation in the embodiment;

FIGS. 9A to 9C are diagrams showing an operating procedure in the case where the kind of sound and the volume when the volume button is depressed are displayed for a predetermined time or for a period of time during which a volume switch button is continuously operated and, when a specific operation is performed during the display or when a sound of another kind different from the kind of the sound which is being displayed is generated, the volume display is stopped in the embodiment.

DETAILED DESCRIPTION OF THE PREFERRED EMBODIMENTS

Figure 1:
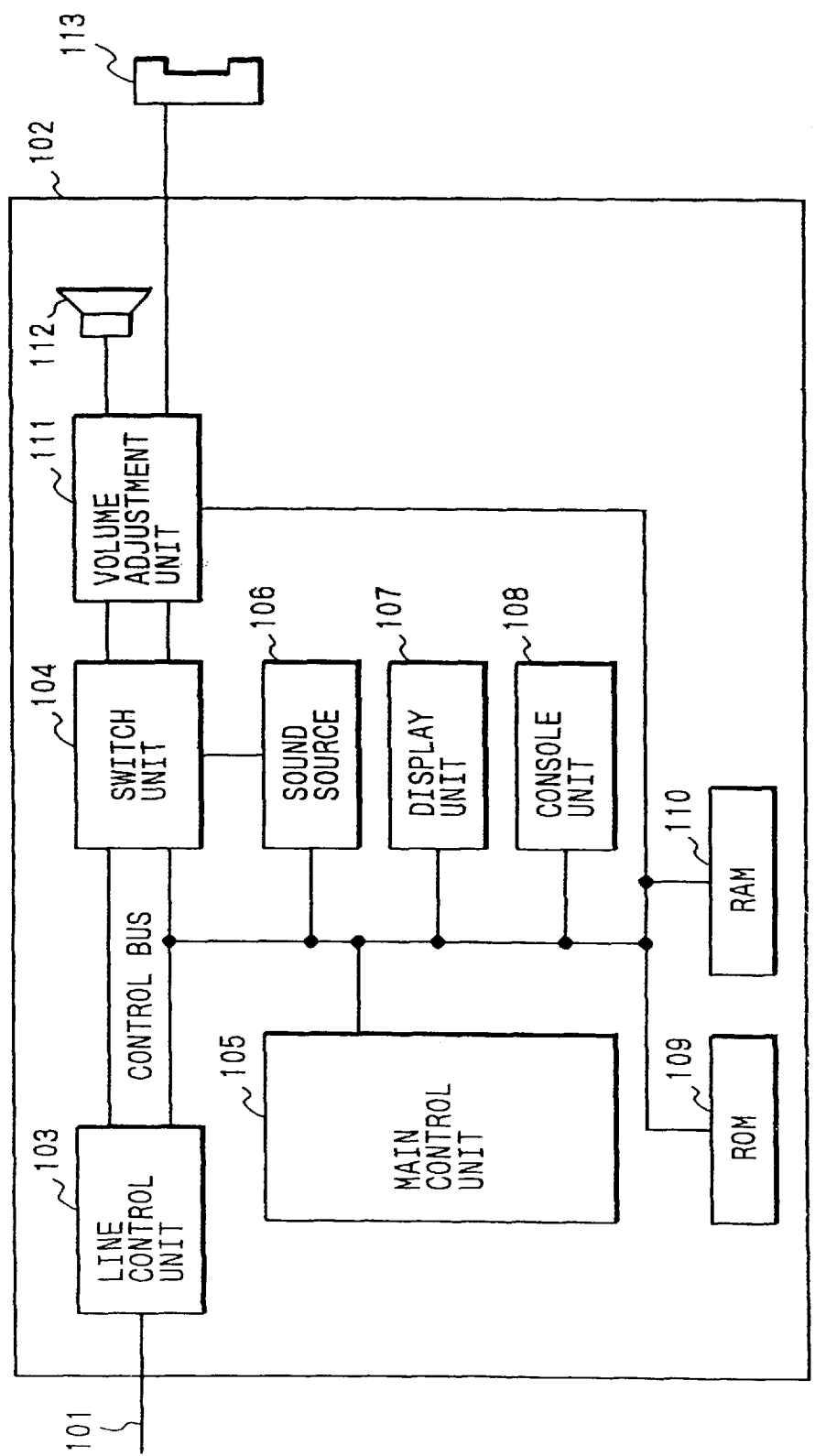
FIG. 1 is a block diagram of a telephone apparatus showing an embodiment of the invention.

FIG. 1 is a block diagram showing an embodiment of the invention. Reference numeral 101 denotes a telephone line; 102 a telephone apparatus; 103 a line control unit to execute a dial transmission or a reception detection; 104 a switch unit for transmitting a sound from the telephone line 101 to a speaker 112 or a handset 113, for transmitting a sound from the handset 113 to the line 101, and further for transmitting a sound from a sound source 106 in the telephone apparatus to the speaker 112 or the handset 113; 105 a main control unit for executing various controls of a display unit 107 and the like of the telephone apparatus; 106 the sound source for generating a reception ringing sound, a touch tone when a button is depressed, and the like; 107 the display unit for displaying numbers when dialing or the like; 108 a console unit including dial buttons and the other operation buttons and the like; 109 a ROM in which a control program and the like have been stored; 110 a RAM for storing various kinds of volume data and various data; 111 a volume adjustment unit for adjusting a reception sound volume of the handset 113, a reception sound volume of the speaker 112, and the like; 112 the speaker for ringing a reception sound or for monitoring the sound from the telephone line; and 113 the handset.

Figure 2:
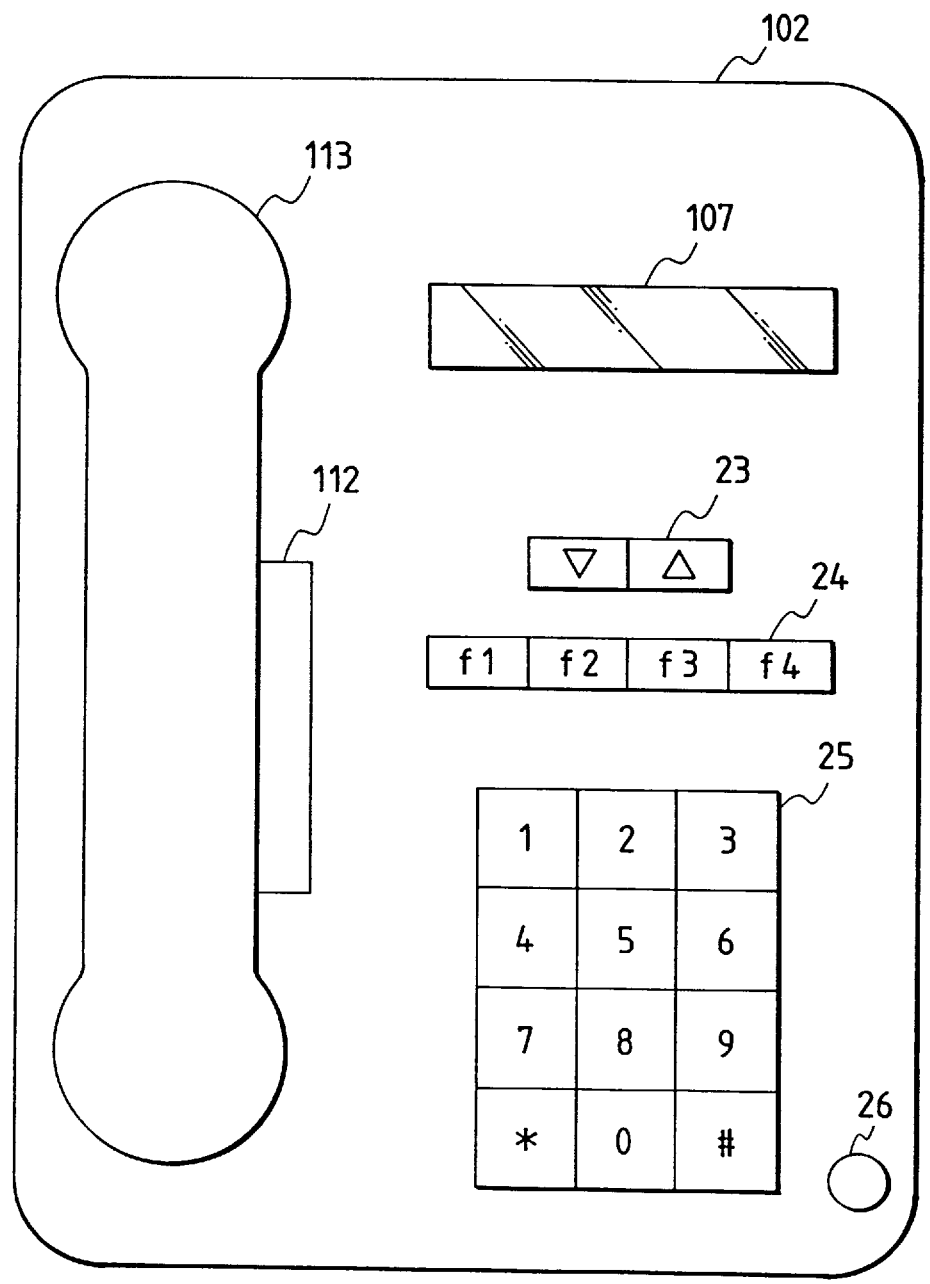
FIG. 2 is a diagram showing an example of an external view of the telephone apparatus in the embodiment.

FIG. 2 is an external view of the telephone apparatus 102 showing the embodiment of the invention. Reference numeral 102 denotes the telephone apparatus main body; 112 the speaker; 113 the handset; 107 the liquid crystal display unit for displaying a telephone number when dialing or the like; 23 volume buttons for switching the volume; 24 function buttons for performing a setting operation or the like; 25 dial buttons; and 26 a speaker button for setting a speaker reception mode. The button (Δ) on the right side of the volume buttons 23 denotes the volume increasing (or volume-up) button and the button (∇) on the left side indicates the volume reducing (or volume-down) button. The volume buttons 23, function buttons 24, dial buttons 25 and speaker button 26 correspond to the console unit 108.

In the above construction, when the telephone apparatus is in an unused state, namely, in an on-hook state, month/day/time as shown in FIG. 3A is displayed on the display unit 107. When the handset 113 is off-hooked and the telephone line 101 is captured and the telephone number is dialed by the dial buttons 25, the numbers dialed are displayed as shown in FIG. 3B.

The operation in the embodiment will now be described hereinbelow.

First, the operation when the main control unit 105 changes the volume of the touch tone at the time of depression of the button, the handset reception sound volume, the speaker reception sound volume, and the reception ringing volume will be described with reference to the flowchart shown in FIG. 4. In the case where the volume button 23 in the console unit 108 isn't depressed yet in step S401, when the state of the speaker 112 is off (S402) and the handset is in the on-hook state (S403), namely, in a standby state, the main control unit 105 allows the display unit 107 to display the time as shown in FIG. 3A (S404). On the other hand, when the speaker 112 is in an on-state in step S402 or the handset is in the off-hook state and the line is being captured in step S403, a message indicating that the line is being captured is displayed, for example, the telephone number of the speech communication partner as shown in FIG. 3B or the speech communicating time is displayed (S405).

Subsequently, when the volume button 23 in the console unit 108 is depressed in step S401, a proper operation is executed according to the state at that time. That is, during the reception (S406), the reception sound until that time is read out from the RAM 110 and the volume of the reception ringing sound after it was changed is written to the RAM 110 and is displayed by the display unit 107 as shown in FIG. 3E (S412). When the telephone is not in the reception in S406 and the speaker is in the on-state (S407), the speaker reception sound volume until that time is read out from the RAM 110 and the volume of the speaker reception after it was changed is written to the RAM 110 and is displayed by the display unit 107 as shown in FIG. 3D (S411).

When the speaker is in the off state in step S407 and the handset is in the off-hook state (S408), the handset reception sound volume until that time is read out from the RAM 110 and the volume of the handset reception after it was changed is written to the RAM 110 and is displayed by the display unit 107 as shown in FIG. 3C (S410). When the handset is in the on-hook state in S408, the volume of the touch tone at the time of the button depression is read out from the RAM 110 and the volume of the touch tone after it was changed is written into the RAM 110 and is displayed by the display unit 107 as shown in FIG. 3F.

As mentioned above, when the volume button is depressed, the kinds of various sounds and the volumes can be simultaneously displayed in accordance with the state of the telephone apparatus at that time. FIGS. 3C to 3F show the examples in the case where the information is displayed by the display unit with a dot matrix construction of (5×7) dots or more. FIGS. 3G to 3J show display examples in the case where information is displayed by a 7-segment display unit.

FIGS. 3A to 3J show the examples at a specific level as display examples of the volumes. FIGS. 5A to 5F show steps in which a volume display changes by the volume buttons 23. That is, when the speaker reception sound volume is at the "0" level and the volume-up button is once depressed, the level is set to the "1" level and is displayed as shown in FIG. 5B. On the contrary, when the volume is at the "1" level and the volume-down button is once depressed, the volume is set to the "0" level and is displayed as shown in FIG. 5A. With respect to FIGS. 5C to 5F, the volume is also similarly displayed by the "2" level to "5" level in correspondence to the level after completion of the volume change by the depression of the volume buttons 23. Since the same shall also apply to the volumes other than the volume of the speaker, their display examples are omitted here.

There is a case, however, where it is requested to change various volumes irrespective of the operating state of the telephone apparatus. The operation when the main control unit 105 adjusts the reception sound volume by a predetermined specific operation will now be explained with reference to the flowchart in FIG. 6. Each volume adjustment mode is set as follows. When the dial button "1" is depressed after an f1 button in FIG. 2 was depressed, an adjustment mode of the reception sound volume is set. When the dial button "2" is depressed after the f1 button was depressed, an adjustment mode of the speaker reception volume is set, and the like. When the f1 button is again depressed, the apparatus exits from the volume adjustment mode.

When the processing routine advances to the volume adjustment mode in step S600, the following operations are executed. The main control unit 105 monitors that the volume button 23 in the console unit 108 is input in step S601. When the volume button 23 is input and the mode at that time is the adjustment mode of the reception ringing sound volume (S602), the reception sound volume stored in the RAM 110 is changed and the changed volume is displayed by the display unit 107 (S608).

When the speaker reception volume adjustment mode has been set instead of the reception sound volume adjustment mode in step S602 (S603), the speaker reception volume stored in the RAM 110 is changed and the volume after the change is displayed by the display unit 107 (S607). When the apparatus is not in the speaker reception volume adjustment in step S603 but the handset reception volume adjustment mode has been set (S604), the handset reception volume stored in the RAM 110 is changed and the volume after the change is displayed by the display unit 107 (S606). If the apparatus is not in the handset reception volume adjustment in step S604, this means that the apparatus has been set to the touch tone volume adjustment mode. Therefore, the touch tone volume stored in the RAM 110 is changed and the volume after the change is displayed by the display unit 107 (S605).

The operations when the main control unit 105 allows the display unit 107 to simultaneously display the kind of sound and the volume at that time for a predetermined time from the depression of the volume button 23 will now be described with reference to the flowchart shown in FIG. 7.

The main control unit 105 monitors the input of the volume button 23 in the console unit 108 in step S701. Step S701 corresponds to step S401 in FIG. 4. When the volume button 23 is input, a timer of an amount of time to display the volume is started (S702). As explained in steps S406 to S412 in FIG. 4, the volume to be changed is changed according to the state at that time or the like, and the kind of the sound and the volume after the change are displayed by the display unit 107 (S703). That is, the process in step S703 is similar to the processes in steps S406 to S412 in FIG. 4.

When the volume button isn't input in step S701, a check is made to see whether the volume display time started in step S702 is being counted or not (S704). When the time is being counted in step S704, a check is made to see whether the timer has timed over or not (S705). If NO, the processing routine advances to step S703 and the volume display is continued. When the timer times over in step S705, the time counting operation of the timer is stopped (S706). When the speaker is in the on-state (S707) or a hook switch is in the off-hook state (S708) in this instance, a message indicating that the line is being captured is displayed by the display unit 107 (S710) in a manner similar to the process in step S405 in FIG. 4. When the speaker is in the off-state and the hook switch is in the on-hook state, the time is displayed by the display unit 107 (S709) in a manner similar to the process in step S404 in FIG. 4.

Figure 4:
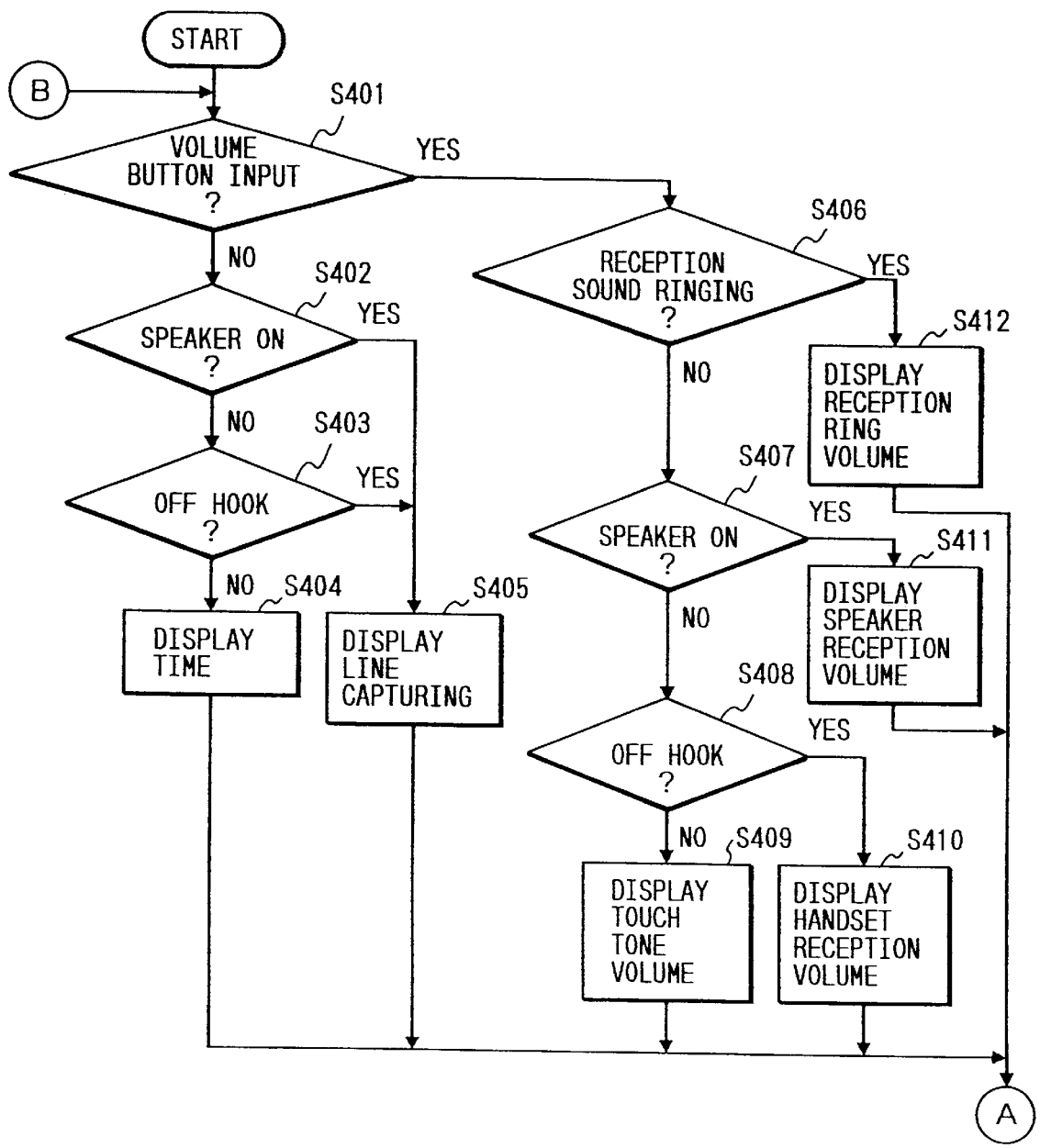
FIG. 4 is a flowchart showing an operating procedure when a volume of a touch tone at a time of the depression of a volume button, a handset reception sound volume, a speaker reception volume, and a reception ringing volume are changed in the embodiment.
Figure 7:
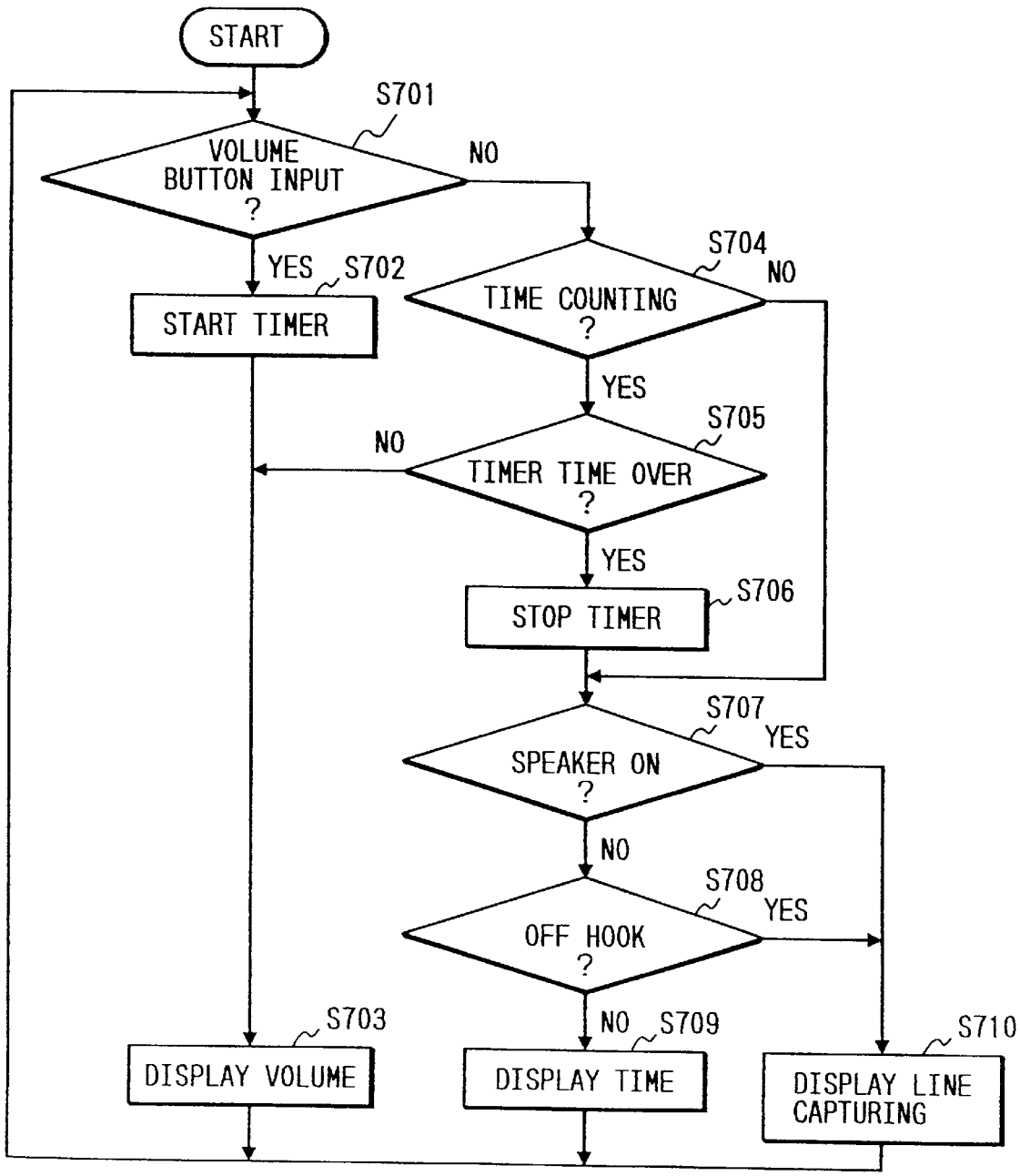
FIG. 7 is a diagram showing an operating procedure when the kind of sound and the volume when the volume button is depressed are simultaneously displayed by the display unit for a predetermined time from the depression of the volume button in the embodiment.

That is, the processes in steps S707 to S710 in FIG. 7 are similar to the processes in steps S402 to S405 in FIG. 4.

In FIG. 7, in order to display the kind of the sound and the volume for a predetermined time from the depression of the volume button 23, step S702 is added between steps S401 and S406 in FIG. 4 and step S704 to S706 are added between steps S401 and S402 in FIG. 4.

The operations of a modification of the invention in the case where the main control unit 105 allows the display unit 107 to simultaneously display the kind of sound and the volume at that time for a period of time during which the volume button 23 is depressed will now be explained with reference to a flowchart shown in FIG. 8.

The main control section 105 monitors the input of the volume button 23 in the console unit 108 in step S801. Step S801 corresponds to step S401. When the volume button 23 is input, the input state of the button is judged in step S802. When the button input has already been being continued, the processing routine returns to step S801. When the input of the button is just started, the volume of the sound to be changed is changed according to the state at that time or the like as described in steps S406 to S412 in FIG. 4. The kind of sound and the volume after the change are displayed by the display unit 107 (S803).

When there is no input of the volume button in step S801, so long as the speaker is in the on state (S804) or the hook switch is in the off-hook state (S805), a message of "line capturing" is displayed by the display unit 107 (S807). When the speaker is in the off state and the hook switch is in the on-hook state, the time is displayed by the display unit 107 (S806).

Figure 9A:
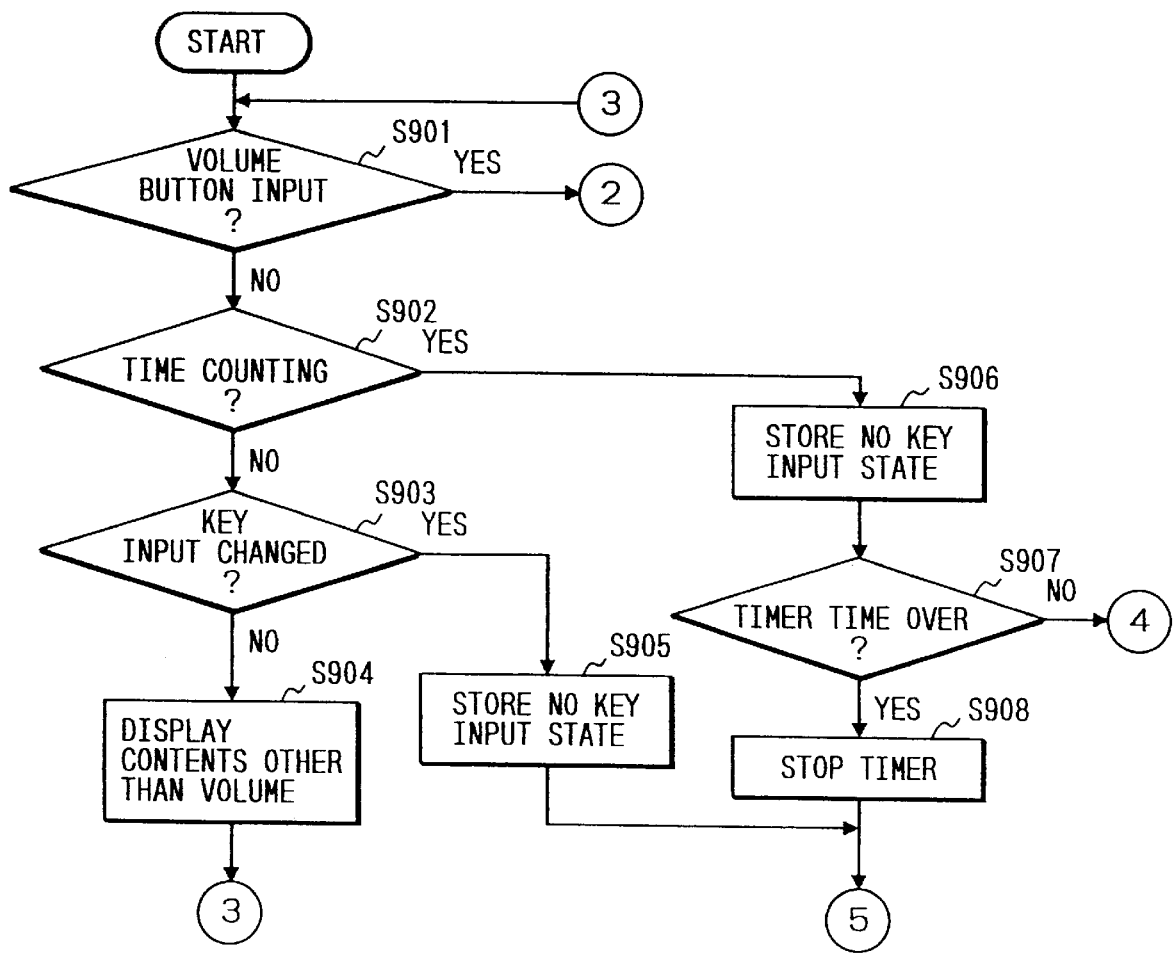
Figure 9C:
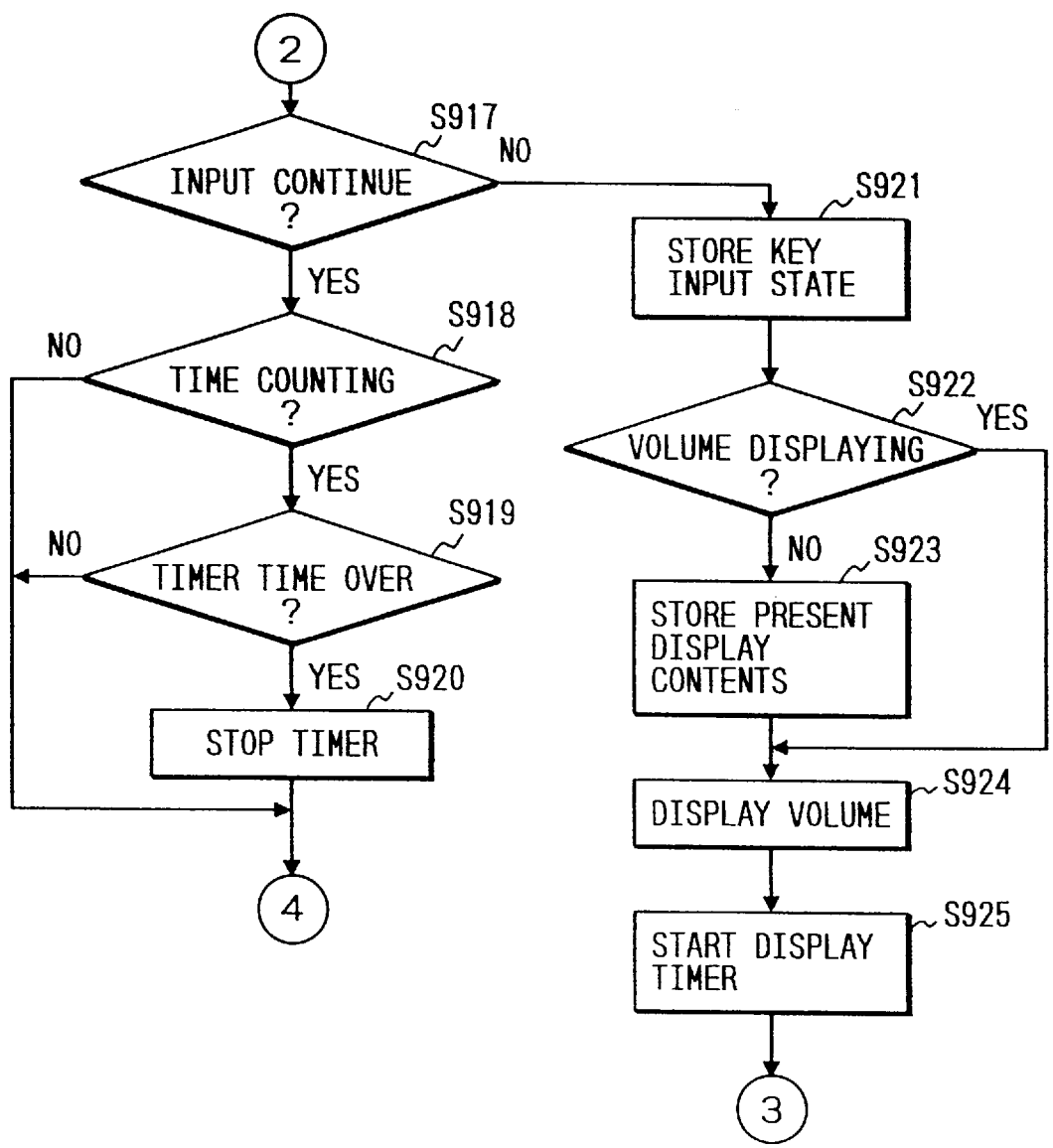

The operations of a modification of the invention in the case where the main control unit 105 allows the kind of sound and the volume at that time to be displayed for a predetermined time or for a period of time during which the volume switch button is continuously operated, and when a specific operation is performed during the display or when the kind of sound different from the kind of sound which is being displayed is generated, the volume display is stopped will now be explained with reference to flowcharts shown in FIGS. 9A to 9C.

The main control unit 105 monitors the input of the volume button 23 in the console unit 108 in step S901. Step S901 corresponds to step S401. When there is the input of the volume button 23, the input state of the button is discriminated in step S917. When the input of the button is just started, a fact that the volume button 23 was inputted is stored in the RAM 110 (S921). The present display state stored in the RAM 110 is checked (S922). When there is a display other than the display of the volume, the display contents at that time are stored in the RAM 110 (S923). In a manner similar to steps S409 to S412 in FIG. 4, the kind of sound and the volume after the change are newly stored in the RAM 110 as present display contents and are also displayed by the display unit 107 (S924). The operation of the display timer is started (S925). When the display contents relate to the volume display in step S922, the processing routine advances to step S924 without executing step S923.

When the volume button 23 has already been inputted and the input is being continued in step S917, the display timer is checked (S918). When the timer has already stopped, the processing routine advances to step S910. When the display timer is performing the counting operation in step S918, the timer value is checked (S919). When the time doesn't time over, the processing routine advances to step S910. When the display timer times over in step S919, the timer is stopped (S920) and the processing routine advances to step S910. After the display timer was stopped in step S920, therefore, the processes in step S910 and subsequent steps are executed as long as the volume button 23 is continuously depressed.

When there is no input of the volume button 23 in step S901, the display timer is checked (S902). When the display timer is executing the counting operation, a fact that there is no input of the button is stored to the RAM 110 (S906). The timer value is checked (S907). When the timer doesn't time over, the processing routine advances to step S910. When the display timer times over in step S907, the timer is stopped (S908). Since there is no condition of the volume display, the display contents stored in the RAM 110 in step S923 or the display contents changed in step S916 are read out and are retrieved in the display unit 107 (S909).

When the timer has already been stopped in step S902, the input state of the volume button 23 is judged in step S903. When the input of the volume button 23 is just finished, a fact that there is no input of the volume button 23 is stored in the RAM 110 (S905). Since there is no condition of the volume display, the stored display contents are retrieved (S909). When the state of no input of the volume button has already been being continued in step S903, information other than the volume, for example as shown in FIGS. 3A and 3B, the time and the message "line capturing" are displayed by the display unit 107 according to the state at that time (S904) in a manner similar to steps S404 and S405 in FIG. 4.

In a state in which the volume displaying state is being continued, whether the kind of sound has been changed or not is monitored by a method such that the operator off-hooks the handset from the speaker reception state or the operator off-hooks the handset during the ringing of the reception sound and responds to the reception (S910). When the kind of sound is changed, the timer which is displaying the time is stopped (S911). In association with the change of the sound kind, a check is made to see whether the contents stored in the RAM 110 can be displayed as they are or other contents should be newly displayed in steps S916 and S923 (S912). When the stored contents are displayed as they are, the main control unit 105 reads out the contents from the RAM 110 and allows the display unit 107 to display the contents (S909). Specifically speaking, for example, when the dial numbers at the time of the transmission are displayed during the speaker reception (S904), the displayed dial numbers are stored by the depression of the volume button 23 (S923) and the speaker reception sound volume is displayed (S924). When the handset is off-hooked during the display of the speaker reception sound volume (S910), the display is returned to the dial display (S909), or the like.

When it is judged in step S912 that the other contents are newly displayed, the new contents are displayed by the display unit 107 on the basis of the necessary information in the ROM 109 or RAM 110 according to the state at that time (S913). Specifically speaking, for example, when the dial numbers at the time of the transmission are displayed during the speaker reception (S904), the displayed dial numbers are stored by the depression of the volume button 23 (S923) and the speaker reception volume is displayed (S924). When the line is disconnected by the depression of the speaker button 23 in the console unit 108 during the display, the stored dial numbers are not displayed but the time is displayed (S913), or the like.

When the kind of sound is not changed in step S910, a check is made to see if the operation to cancel the volume display which is being displayed has been performed or not (S914). When the cancelling operation is performed, the processing routine advances to step S911.

When the cancelling operation isn't executed in step S914, a check is made to see if the contents of the display data stored in step S923 are changed or not (S915). If YES, the display contents stored in the RAM 110 are changed (S916). Specifically speaking, for example, the above processes are executed in the case where the time changes when the volume of the touch tone is displayed (S924) by depressing the volume button 23 during the display of the time (S904).

As mentioned above, the kind of sound and the volume at that time are displayed for a predetermined time or for a period of time during which the volume switch button is continuously operated, and when a specific operation is executed during the display or when the sound of the kind different from the kind of sound which is being displayed is generated, the volume display is stopped.

The operations of a modification of the invention in the case where when the volume button 23 is continuously operated for a predetermined time (T1) or longer, the main control unit 105 switches the volume every predetermined time (T2) and allows the display unit 107 to simultaneously display the kind of sound and the volume at that time every time the volume is switched will now be explained with reference to a flowchart shown in FIG. 10.

The main control unit 105 monitors the input of the volume button 23 in the console unit 108 in step S1001. Step S1001 corresponds to step S401 in FIG. 4. When the volume button 23 is inputted, a state of a timer T1 is checked (S1002). When the timer T1 is stopped, a state of a timer T2 is checked (S1003). When the timer T2 is also stopped, it is judged that the input of the volume button 23 has been started. The display contents at that time are stored in the RAM 110, the volume is changed, and the volume after the change is displayed by the display unit 107 together with the kind of sound at that time (S1004), the timer T1 is started (S1005) and the processing routine returns to step S1001.

When the timer T1 is performing the counting operation in step S1002, the counting of the timer T1 is executed (S1007). When the timer T1 doesn't time over, the processing routine returns to step S1001. When the timer T1 times over, the timer T1 is stopped (S1016) and the volume is changed and the volume after the change is displayed by the display unit 107 together with the kind of sound at that time (S1008). The timer T1 is stopped, the timer T2 is started (S1009), and the processing routine is returned to step S1001.

When the timer T2 is performing the counting operation in step S1003, the counting of the timer T2 is executed (S1006). If the timer T2 doesn't time over, the processing routine is returned to step S1001. If the timer T2 times over, the volume is changed. The volume after the change is displayed by the display unit 107 together with the kind of sound at that time (S1008). The timer T2 is started (S1009) and the processing routine is returned to step S1001.

When there is no input of the volume button 23 in step S1001, the state of the timer T1 is checked (S1010). When the timer T1 is counting, the timer T1 is stopped (S1011), the display contents stored in the RAM 110 in step S1004 are read out and are displayed by the display unit 107 (S1012). The processing routine is returned to step S1001. When the timer T1 is stopped in step S1010, the state of the timer T2 is checked (S1013). When the timer T2 is also stopped, the processing routine is returned to step S1001. When the timer T2 is counting, the timer T2 is stopped (S1014), the display contents stored in the RAM 110 in step S1004 are read out and are displayed by the display unit 107 (SlOl5). The processing routine is returned to step S1001.

As mentioned above, when the volume switch button is continuously operated for a predetermined time (T1) or longer, the volume is switched every predetermined time (T2) and the kind of sound and the volume at that time are simultaneously displayed by the display unit.

Although the example in a single telephone which is used by connecting to a public line or an extension of a private branch exchange (PBX) has been shown and described in the above embodiments, it will be obviously understood that the invention can be also applied to a button telephone apparatus or an exclusive-use telephone apparatus of the PBX. It is also possible to control all of the controls of the main control unit shown in the embodiments by a main control unit in the exclusive-use telephone, or by a main apparatus of the button telephone apparatus or a main control unit in the PBX. Further, it is also possible to distribute some controls to a plurality of main control units and to control them.

In case of embodying the invention by a single telephone, a button telephone apparatus, or an exclusive-use telephone of the PBX, it is also possible to use another construction different from the construction shown in FIG. 1.

Although the liquid crystal display apparatus has been described as an example of the displaying means in the embodiment, the invention is not limited to the liquid crystal display apparatus but it is also possible to use a display apparatus using a light emitting diode or a fluorescent display tube or the like. The displaying medium is not specified at all.

Although the external view of the telephone apparatus as an embodiment of the invention has been shown in FIG. 2, the arrangement of each unit has been shown merely as an example. Another arrangement different from that shown in FIG. 2 can be also used. Any other component element which is not shown in FIG. 2 can be also used.

As for the processing contents disclosed in each flowchart, only the minimum processes which are necessary when explaining the embodiment are disclosed. It is sufficiently considered that processes other than the processes disclosed in the flowcharts are added. The order of the processes can be also changed.

As for the display examples shown in FIGS. 3A to 3J, four kinds of sounds have been mentioned. However, it is not always necessary to provide all of them. Sounds other than those sounds can also exist. The display contents are also not limited to those disclosed there. Any display contents can be also used so long as they can recognize the kind of sound and the volume.

The time display in step S404 and the display of "line capturing" in step S405 have been also shown as an example in the flowchart of FIG. 4 and contents other than them can be also displayed. The example in which the volume of the touch tone is changed by depressing the volume button 23 in the on-hook state in step S409 has been shown. It is not always necessary to change the volume of the touch tone and a volume other than the touch tone can be also changed.

In the description of the operation when adjusting the reception volume by the predetermined specific operation in the flowchart in FIG. 6, the volume has been changed by the volume button 23 after the volume adjustment mode was set. However, by using a method whereby when the adjustment mode is set, the volume at that time is displayed and the apparatus exits the adjustment mode without depressing the volume button 23, the volume at that time can be known instead of changing the volume.

Although the example of changing the volume of the touch tone has been shown in step S605, it is not always necessary to change the volume of the touch tone but a volume other than the touch tone can be also changed.

The time display in step S709 and the display of "line capturing" in step S710 have also merely been shown as an example in the flowchart of FIG. 7. Any contents other than those display contents can be also displayed.

Figure 8:
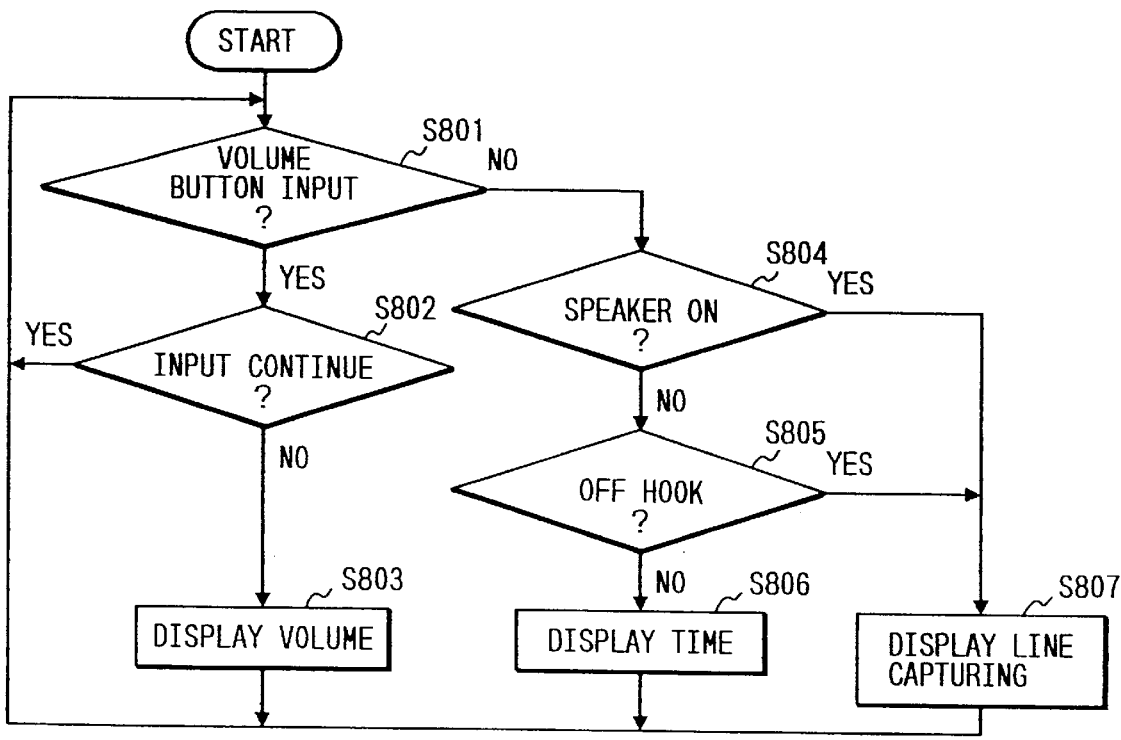
FIG. 8 is a diagram showing an operating procedure when the kind of sound and the volume when the volume button is depressed are simultaneously displayed by the display unit for a period of time during which the volume button is depressed in the embodiment.

Although the time display in step S806 and the display of "line capturing" in step S807 have also been shown as an example in the flowchart of FIG. 8, contents other than those display contents can be also displayed.

In the flowcharts of FIGS. 9A to 9C, some specific examples have been shown in the description in the case where the kind of sound and the volume at that time are displayed for a predetermined time or for a period of time during which the volume button 23 is continuously operated and, when a specific operation is executed during the display or when the sound of the kind different from the kind of sound which is being displayed is generated, the volume display is stopped. However, only examples have merely been shown here and the invention can be also applied to any other examples.

The cancelling operation in step S914 relates to, for example, the specific button operation of the console unit 108. However, when a button other than the volume button 23 is inputted, the input of the volume button 23 has already been extinguished. Therefore, although the input state of the button has already entered the non-input state. However, since the display timer is not always limited to the stop state, the processing routine advances to step S911. The cancelling operation is not limited to the button input but it is also possible to construct in a manner such that the state of the display timer is judged before shifting to step S911 when the cancelling operation is performed and, when the display timer is stopped, the processing routine advances to step S912.

Figure 10:
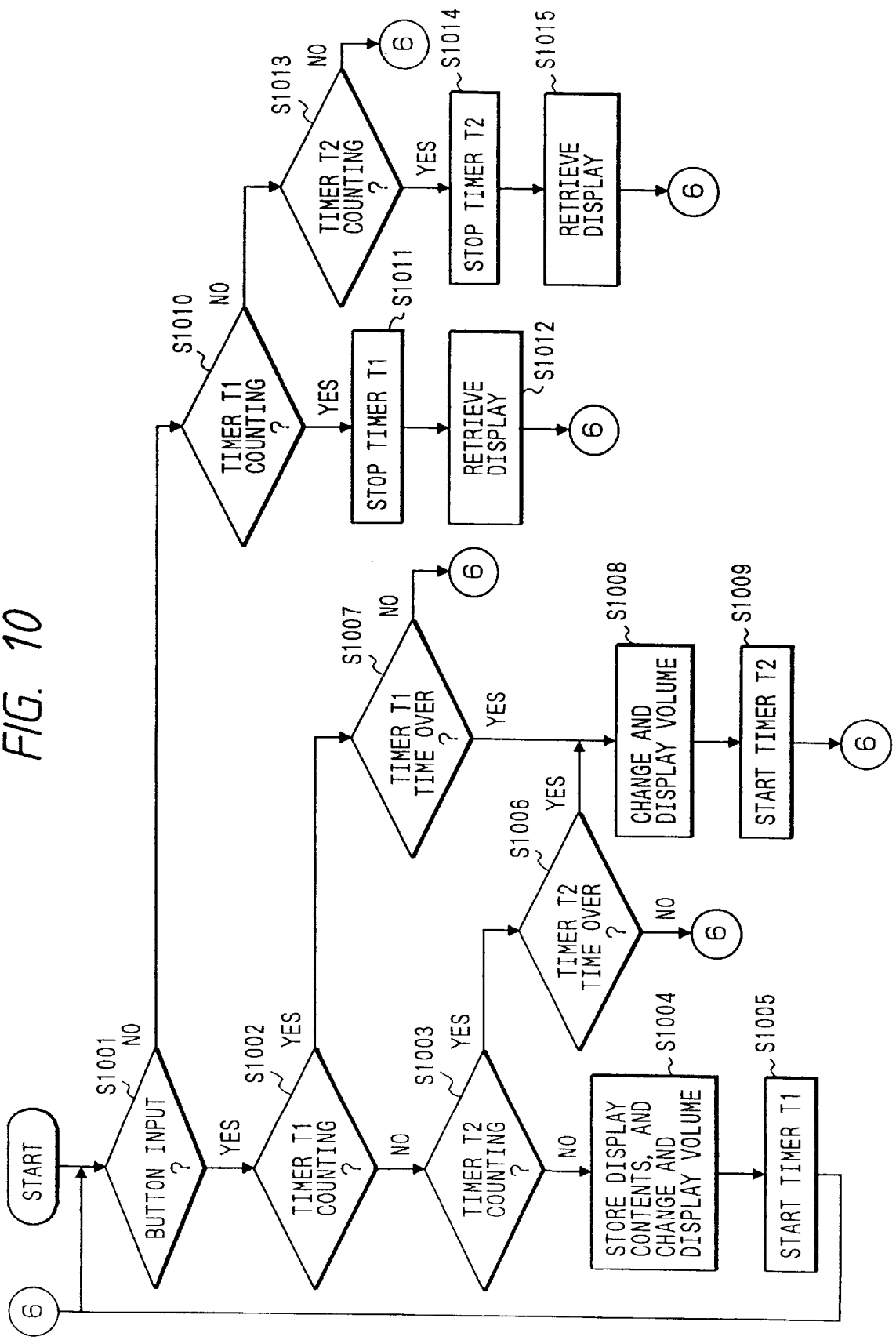
FIG. 10 is a diagram showing an operating procedure in the case where when the volume switch button is continuously operated for a predetermined time or longer, the volume is switched every predetermined time and the kind of sound and the volume at that time are simultaneously displayed by the display unit every time the volume is switched in the embodiment.

In the flowchart of FIG. 10, in the operation in the case where when the volume button 23 is continuously operated for the predetermined time or longer, the volume is switched every predetermined time and the kind of sound and the volume at that time are simultaneously displayed by the display unit every time of the volume switching, the case where the timer T1 is started by the first depression of the volume button 23 and the timer T2 is started after the timer T1 timed over has been described. However, the times of the timers T1 and T2 can be also set to be equal or different. Further, the timer which is started after the timer T2 timed over is also not limited to T2 but the timer value can be also changed each time the timer times over. Although the description has been omitted with respect to the operation when the depression of the volume button 23 is soon finished after the input of the volume button 23, the volume can be also displayed for a predetermined time as explained in the above embodiments.

Although the several embodiments have been described above, there are also cases where a similar effect is also obtained by combining a part of or all of the above embodiments, descriptions in such cases are omitted here.

According to the above embodiments, there is no need to provide the console unit according to each of the plurality of volumes. A plurality of volumes can be set by two buttons of the volume-up button and volume-down button. When setting the volume, by displaying the set volume by the display, the set volume can be visually known. There is no need to provide the volume display unit corresponding to each of the plurality of volumes. The space of the display unit is not increased. The costs are not increased. There is an effect such that the telephone apparatus having an excellent operability can be provided.

Although the present invention has been described with respect to the preferred embodiments, the invention is not limited to the foregoing embodiments but many modifications and variations are possible within the spirit and scope of the appended claims of the invention.

What is claimed is:
1. A communicating apparatus comprising:
 display means;
 first input means for inputting a dial number;
 second input means for inputting volume data; and
 control means for controlling said display means so as to display the dial number inputted by said input means,
  wherein said control means controls said display means such that an element whose level of volume is being adjusted is displayed in place of the dial number in accordance with the volume data inputted by said second input means.
2. An apparatus according to claim 1, wherein said control means includes generating means for generating a plurality of elements of sounds by a plurality of levels of volume.
3. An apparatus according to claim 1, wherein said control means controls said display means so as to display a message indicating that a level of volume of a ringing tone is being displayed and the level of volume of the ringing tone in accordance with the volume data inputted by said second input means during the ringing.
4. An apparatus according to claim 1, wherein said second input means includes designating means for designating the element whose level of volume is to be adjusted.
5. An apparatus according to claim 1, wherein said control means controls said display means so as to display the element whose level of volume is being adjusted and the level of volume for a predetermined time in accordance with the volume data inputted by said second input means.
6. An apparatus according to claim 5, wherein said control means controls said display means so as to display said dial number after the elapse of the predetermined time.
7. An apparatus according to claim 1, wherein said control means controls said display means so as to display the element whose level of volume is being adjusted and the level of volume for a period of time during which an input of the volume data is being performed by said second input means.

8. An apparatus according to claim 1, wherein said control means stops the display of the element whose level of volume is being adjusted and a level of volume where a sound of an element different from the element which is being displayed is generated.

9. An apparatus according to claim 1, wherein said control means changes the level of volume when an input of the volume data by said second input means continues for a predetermined time.

10. An apparatus according to claim 1, wherein said control means changes the level of volume in accordance with the volume data inputted by said second input means.

11. An apparatus according to claim 1, wherein said control means has two modes of a handset speech communication mode and a speaker reception mode, and in either one of said two modes, when the mode is shifted to the other one of said two modes during the display of the element whose level of volume is being adjusted and the level of volume, said control means controls said display means so as to display said dial number.

12. A method for controlling a display of a communication apparatus, comprising:
   a first input step of inputting a dial number;
   a first control step of controlling the display so as to display the dial number inputted in said first input step;
   a second input step of inputting volume data; and
   a second control step of controlling the display of an element whose level of volume is being adjusted, wherein the element whose level of volume is being adjusted is displayed in the place where the dial number is displayed in accordance with the volume data inputted in said second input step.

13. A method according to claim 12, wherein a plurality of elements of sound are generated by a plurality of levels of volume in said second control step.

14. A method according to claim 12, wherein a message indicating that a level of volume of a ringing tone is being displayed and the level of volume of the ringing tone in said second control step.

15. A method according to claim 12, wherein the element whose level of volume is to be adjusted is inputted in said second input step.

16. A method according to claim 12, wherein the element whose level is being adjusted and the level of volume are displayed for a predetermined time in said second control step.

17. A method according to claim 16, wherein the dial number is displayed after the predetermined time.

18. A method according to claim 12, wherein the element whose volume is being adjusted and the level of volume is displayed for a period of time during which an input of the volume data is being performed in said second input step.

19. A method according to claim 12, wherein the display of the element whose level of volume is being adjusted is terminated when a sound of an element different from the element which is being displayed is generated.

20. A method according to claim 12, wherein the level of volume is changed in said second control step when an input of the volume data in said second input step continues for a predetermined time.

21. A method according to claim 12, wherein the level of volume is changed in said second control step in accordance with the volume data inputted in said second input step.

22. A method according to claim 12, wherein the dial number is displayed when the states of a handset and a speaker in the communication apparatus are changed while the element whose level of volume is being adjusted and the level of volume are displayed in said second control step.

23. A method according to claim 16, wherein the element whose level of volume is being adjusted and a level of volume is displayed in said second control step.

24. A method according to claim 16, wherein the dial number is displayed in said first control step in accordance with an input of the dial number, and the element whose level of volume is being adjusted is displayed in said second control step in accordance with an input of the volume data.

25. An apparatus according to claim 1, wherein said control means controls said display means so as to display the element whose volume is being adjusted and a level of volume wherein the element whose volume is being adjusted.

26. An apparatus according to claim 1, wherein said control means controls said display means so as to display the dial number in accordance with an input of the dial number and the element whose volume is being adjusted in accordance with an input of the volume data.

27. A communication apparatus comprising:
   display means;
   first input means for inputting a dial number;
   second input means for inputting volume data;
   third input means for inputting a line disconnection request; and
   control means for controlling said display means such that an element whose level of volume is being adjusted is displayed where the dial number inputted by said first input means has been displayed, in accordance with the volume data inputted by said second input means,
   wherein said control means controls said display means such that a time is displayed where the element whose level of volume being adjusted has been displayed, in accordance with the line disconnection request inputted by said third input means.

28. An apparatus according to claim 27, further comprising communication means, and
   wherein said control means controls said display means such that the dial number which was displayed before the element whose level of volume, is displayed in accordance with an operation of said communication means.

29. An apparatus according to claim 28, wherein said control means judges whether the line disconnection request is inputted by said third input means or the operation of said communication means is performed in a state where the element whose level of volume is being adjusted is displayed where the dial number inputted in said input means is displayed.

30. A method for controlling a display of a communication apparatus, comprising:
   a first input step of inputting a dial number;
   second input step for inputting volume data;
   third input step for inputting a line disconnection request; and
   a control step for controlling said display such that an element whose level of volume is being adjusted is displayed where the dial number inputted by said first input step has been displayed, in accordance with the volume data inputted by said second input step, wherein said control step controls the display such that a time is displayed where the element whose level of volume being adjusted has been displayed, in accordance with the line disconnection request inputted in said third input step.

31. A method according to claim 30, wherein said control step controls the display such that the dial number which was displayed before the element whose level of volume, is displayed in accordance with an operation of a communication unit.

32. A method according to claim 31, wherein said control step judges whether the line disconnection request is inputted in said first input step or the operation of the communication unit is performed in a state where the element whose level of volume is being adjusted is displayed where the dial number inputted in said first input step is displayed.

* * * * *